Sept. 1, 1942.  C. E. CONNOLLY  2,294,739
ELAPSED TIME RECORDER
Filed Sept. 17, 1941  9 Sheets-Sheet 1

FIG.1.

INVENTOR
Chas. E. Connolly
BY
ATTORNEY

Sept. 1, 1942.   C. E. CONNOLLY   2,294,739
ELAPSED TIME RECORDER
Filed Sept. 17, 1941   9 Sheets-Sheet 4

FIG.4.

INVENTOR
Chas. E. Connolly
BY
ATTORNEY

Sept. 1, 1942.   C. E. CONNOLLY   2,294,739
ELAPSED TIME RECORDER
Filed Sept. 17, 1941   9 Sheets-Sheet 8

INVENTOR
Chas. E. Connolly
BY
W. M. Wilson
ATTORNEY

Sept. 1, 1942.    C. E. CONNOLLY    2,294,739
ELAPSED TIME RECORDER
Filed Sept. 17, 1941    9 Sheets-Sheet 9

INVENTOR
Chas. E. Connolly
BY
W. M. Watson
ATTORNEY

Patented Sept. 1, 1942

2,294,739

UNITED STATES PATENT OFFICE 2,294,739

ELAPSED TIME RECORDER

Charles E. Connolly, Endicott, N. Y., assignor to International Business Machines Corporation, New York, N. Y., a corporation of New York Application September 17, 1941, Serial No. 411,247

5 Claims. (Cl. 234—43)

This invention relates to time recorders and, more particularly, to recorders of the type which measures elapsed time.

It is the general object of the instant invention to provide a relatively simple, inexpensive machine which will compute automatically and print on a record card the time which elapses between the start and finish of a job. Any predetermined time-out periods may be automatically deducted from this elapsed time.

According to the invention, the starting time of a job is recorded by inserting a record card in the machine and depressing an operating handle. The printing of the starting time is accompanied by the punching of two holes in the card in predetermined locations dependent upon the condition of a pair of elapsed time typewheels. The operating handle is then released, permitting the operator to remove the card. For obtaining the stopping time and elapsed time at the end of the job, the card is inserted upside down. The holes in the card are then effective to set up the elapsed time type-wheels for printing the elapsed time. The stopping time is merely a straight time recording proposition. The card is provided with a cut corner so that the machine may sense whether the card is being inserted for the starting time or stopping time of a job.

Other objects of the invention will be pointed out in the following description and claims and illustrated in the accompanying drawings, which disclose, by way of example, the principle of the invention and the best mode, which has been contemplated, of applying that principle.

Figure 1:
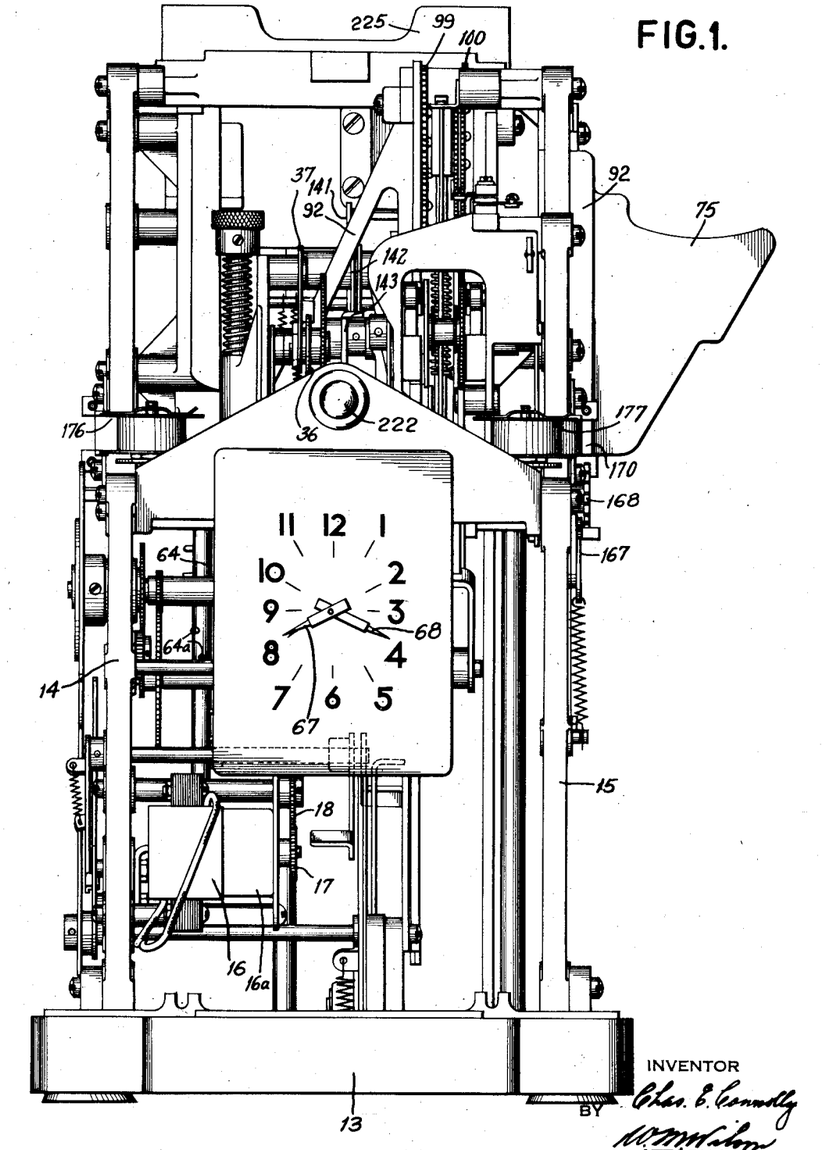
Fig. 1 is a front elevation of the machine with the covers removed.

Referring now to the drawings and particularly to Fig. 1, the machine shown there is mounted on a base 13. The various units of the machine are supported generally between side frames 14 and 15 which extend vertically upward from the base 13. These units will be considered individually under appropriate headings to promote a clearer understanding of the invention.

*Time typewheel and punch selection drive*

Figure 3:
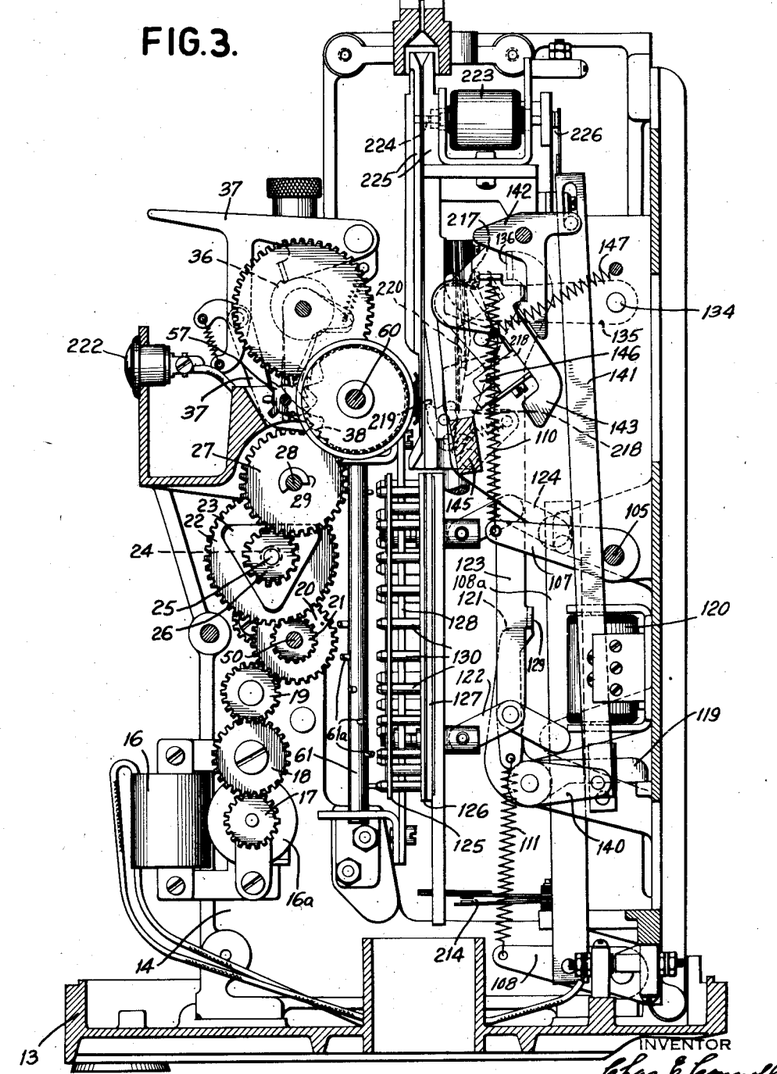
Fig. 3 is a section taken from front to rear at approximately the center of the machine.
Figure 5:
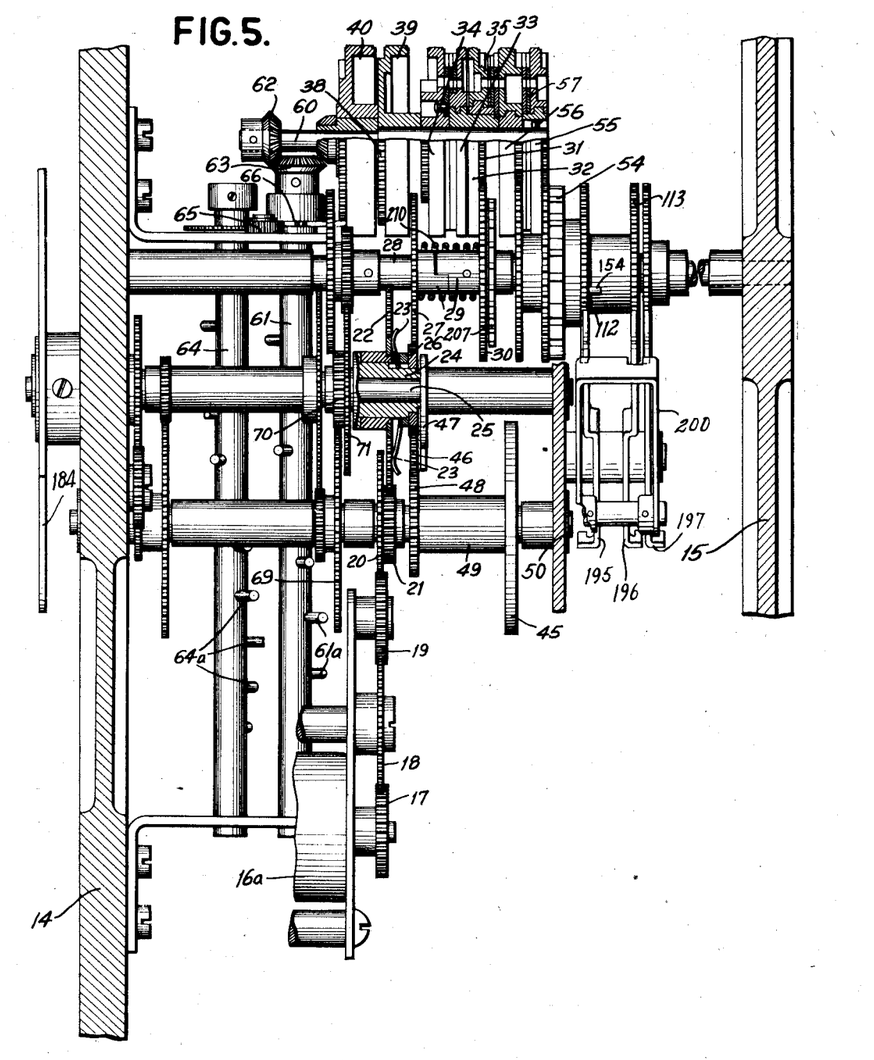
Fig. 5 is an enlarged detail view of the drive gearing of the machine.

The timekeeping mechanism is controlled by a synchronous motor 16 (Fig. 3) driving through a train of gears including gear 17 connected to the rotor 16a of the motor, gears 18, 19, 20, 21 and 22, through a frictional coupling comprising a flat spring 23 and hub 24 (Fig. 5) on shaft 25, gear 26 keyed to the hub 24, gear 27 connected to shaft 28 through coupling 29, and gear 30 connected to the minute units type gear 31. The arrangement is such that through the mechanism just traced the minute units typewheel 32 advances continuously at the rate of one type position per minute. A ten minutes typewheel 33 and an hour typewheel 34 are operated through Geneva transfer pinions 35. The time is carried to the day typewheel 39 by further transfer means comprising a cam 36 (Fig. 3) and a cam follower and pawl assembly 37 cooperating with the cam and also with a ratchet 38 attached to the day typewheel. Cam 36 makes one revolution every twenty-four hours to cause stepping of the day typewheel one position. The month typewheel 40 (Fig. 5) is set manually. Mechanism of this sort for shifting the typewheels in accordance with time is conventional in the time recording art.

Figure 2:
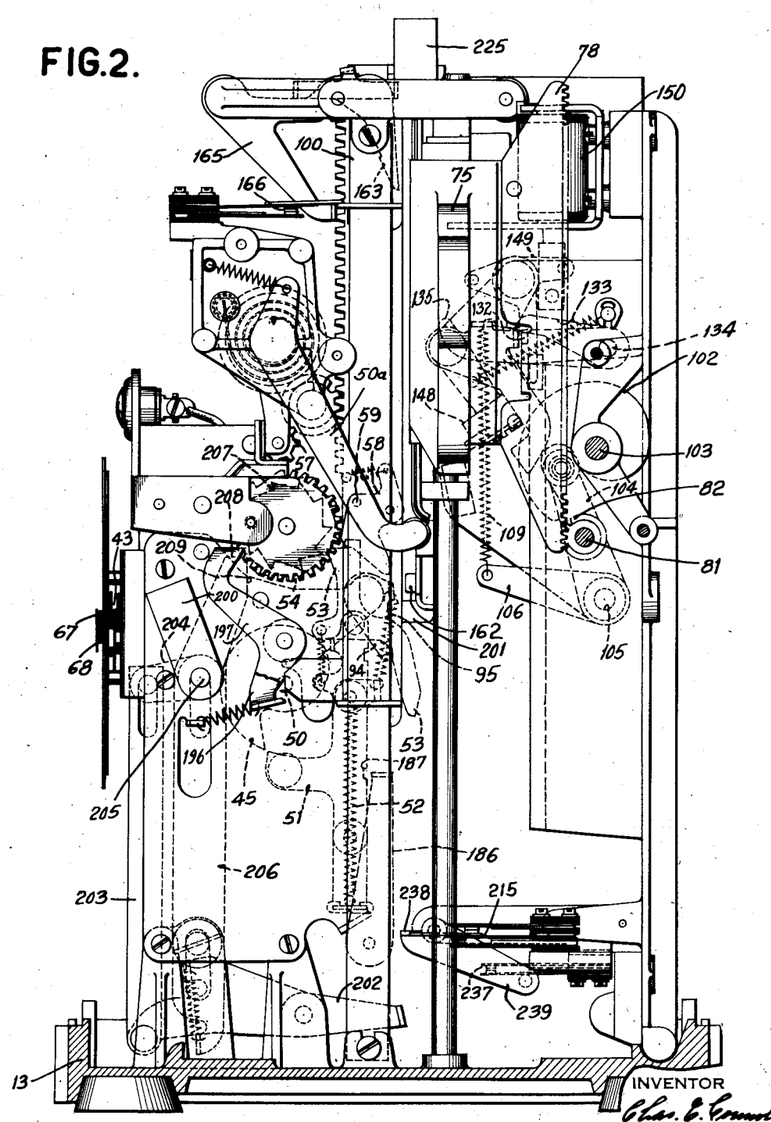
Fig. 2 is a sectional view taken front to rear at a point just inside of the right side frame.

The elapsed time is entered into the elapsed time typewheels by movement derived from a cam 45 driven by the motor drive gearing previously described as far as gear 26, then through idler gear 46 carried by a plate 47 which is suspended from shaft 25 and gear 48 and collar 49 to cam 45. The cam 45, collar 49, and gear 48 are loosely mounted on a shaft 50 to which gears 21 and 22 of the motor drive gear train are secured. A pawl slide 51 (Fig. 2) is thrown from the high point of cam 45 every six minutes by a connecting spring 52, allowing a pawl 53, pivoted to the upper end of slide 51, to feed a ratchet 54 one tooth. Ratchet 54 is geared with the elapsed tenths-of-hours typewheel 55 (Fig. 5) which transfers to the elapsed hours typewheel 56 through the medium of a Geneva pinion 57. An overthrow latch 58 (Fig. 2) is operated by the pawl 53 as the latter strikes a pin 59 on the latch to throw the latch into the path of the next tooth of ratchet 54.

The elapsed tenths-of-hours typewheel 55 (Fig. 5) is keyed to a shaft 60 which drives the tenths punch selector shaft 61 through bevel gears 62 and 63. Shaft 61 transfers once every revolution into the hours punch selector shaft 64 by means of Geneva transfer pinion 65 operated from a single toothed member 66 on shaft 61.

The clock hands 67 and 68 are driven by a secondary movement, represented as 43 (Fig. 2), which is frictionally driven from the motor drive gearing through connection with a gear 69 (Fig. 5) which in turn connects with the motor drive gear train through gears 70 and 71 and hub 24.

Carriage and operating handle

Figure 4:
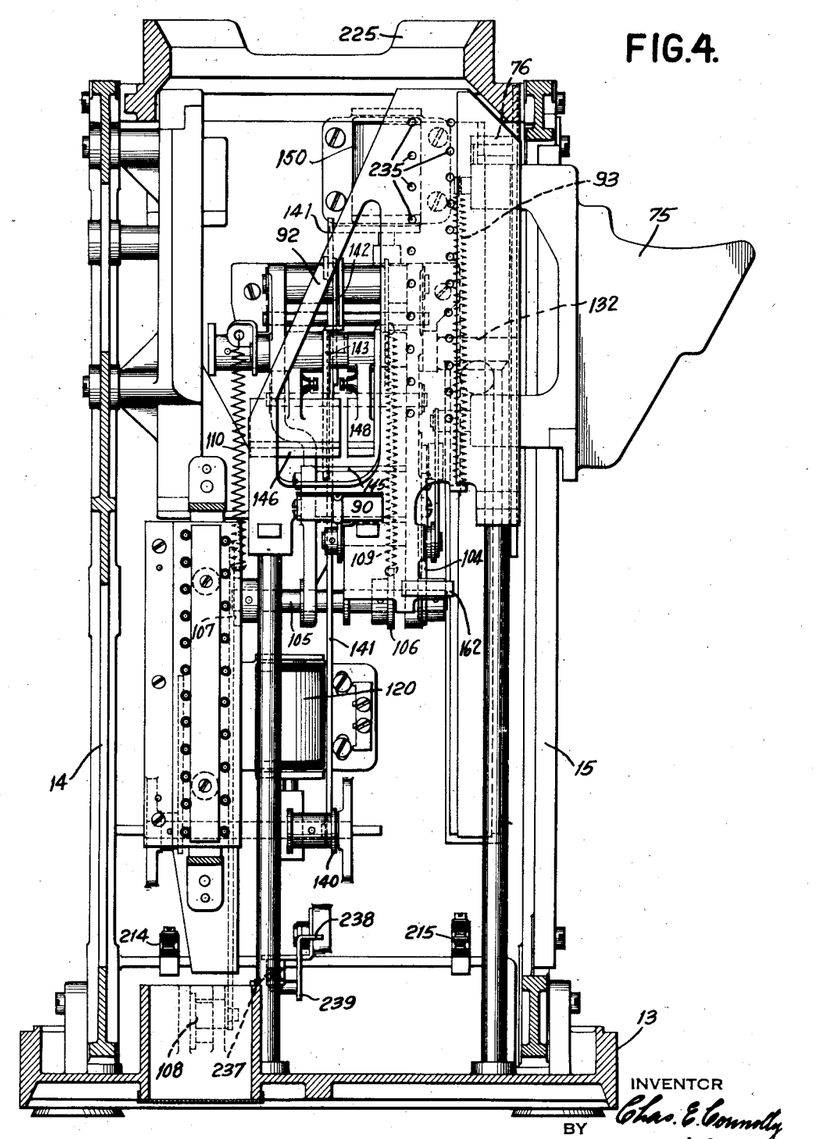
Fig. 4 is a sectional view taken from left to right just in front of the carriage mechanism of the machine.
Figure 6:
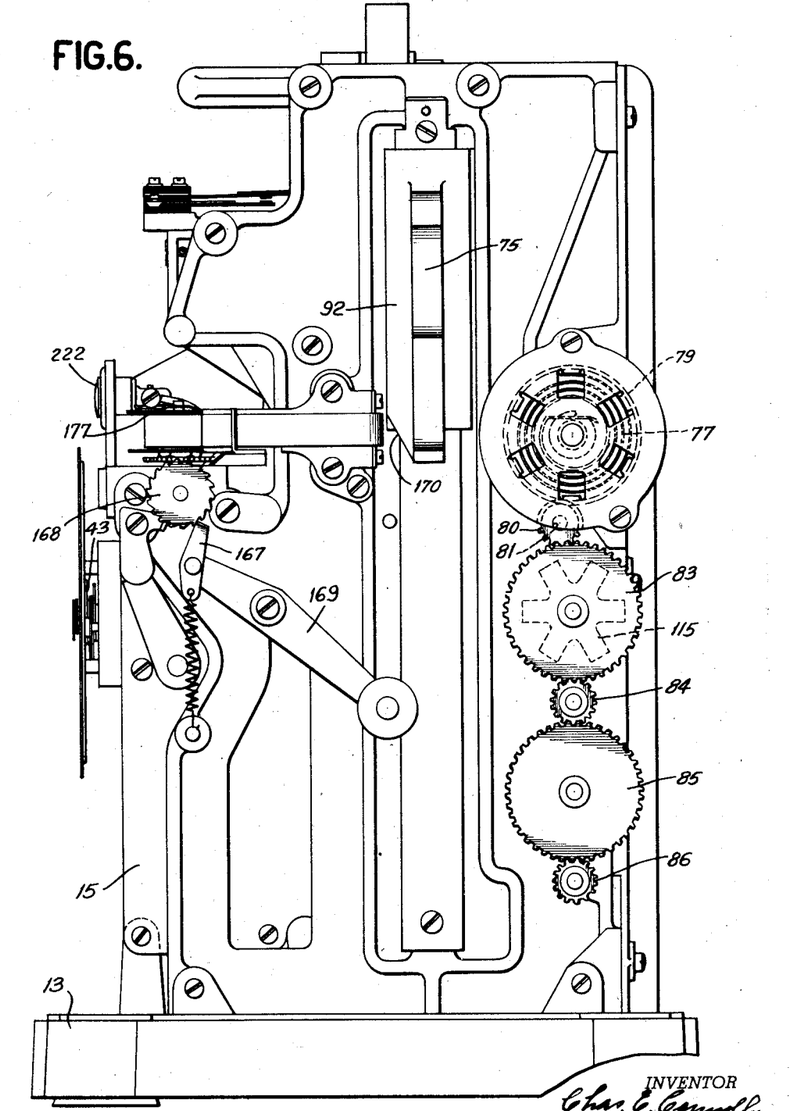
Fig. 6 is a right elevation view of the machine.
Figure 7:
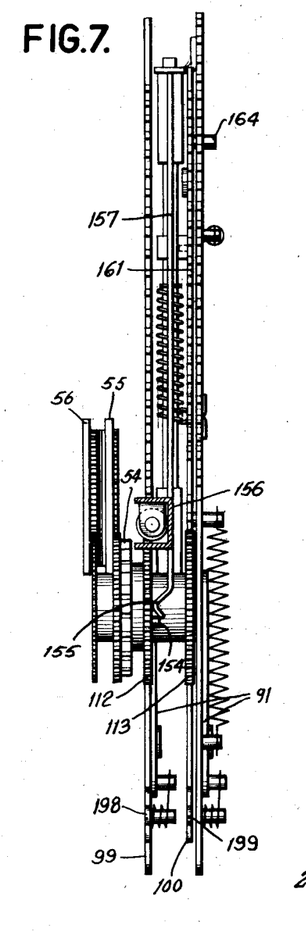
Figs. 7 to 9 are detail views of the borrow mechanism.

The operating handle 75 is normally held against a stop 76 (Fig. 4) by the energy stored in a spiral spring 77 (Fig. 6). The spring is geared to a rack 78 riveted to the handle 75 through a gear 79 on which the spring is mounted, a gear 80 fixed to a short shaft 81, and a gear 82 also secured to shaft 81 (Fig. 2) which meshes with the teeth of the rack 78. The large gear train represented by gears 83, 84, 85 and 86 serves to restrain or govern the effect of the spring 77 on the movement of the rack 78.

In the normal position, the operating handle 75 holds a spring-biased gripper 90 (Fig. 4) open. The initial movement of the handle permits the gripper to clamp the lower edge of an inserted card between a carriage plate 92 and the gripper. After a short period of movement of the handle, a spring 93 connected between the carriage and the handle provides an additional bias on the gripper 90 and also holds the carriage 92 against the lower surface of the operating handle.

During the first portion of the carriage travel, safety latch 94 (Fig. 2) is released allowing a spring 95 to hold it in such a position as to lock out the tenths feed slide 51, thereby preventing time entries from being made in the elapsed time wheels while the carriage is displaced from its home position.

The first movement of the carriage 92 also cams the elapsed time transfer pinion 57 out of mesh with the typewheel gears, leaving them free to be reversed by the elapsed time racks 99 and 100 as will be explained later. This camming-out is accomplished through arm 50a operating off the carriage.

As the carriage 92 continues to move, it strikes the tail of the tenths feed pawl 53, camming the pawl out of the path of the ratchet 54, and thereby maintaining a clearance between the pawl and ratchet to prevent an undesirable "ratcheting" condition from occurring when the typewheels are reversed.

A cam 102 (Fig. 2), pinned to a short shaft 103, is rotated as the handle 75 is depressed, causing operation of a cam follower arm 104 which is connected to a rotatable shaft 105. Arms 106 and 107 are also secured to shaft 105 and are actuated when shaft 105 is rocked by the cam 102 acting through follower arm 104. Arm 108 (Fig. 3) is also actuated through link 108a when shaft 105 is rocked. The actuation of arms 106, 107, and 108 causes the arms to tension springs 109, 110, and 111, respectively, which are normally without tension.

Included in the train of gears which restrict the speed of manual operation of handle 75 is a slip clutch generally designated 115 (Fig. 6). The purpose of this clutch is to take up any sudden strains produced by starting or stopping the handle suddenly.

Punch mechanism

Punch selection is controlled by the selector shafts 61 and 64 by means of their differentially located pins 61a and 64a, respectively, which are synchronized with the elapsed time wheels. Power means for the punching operation is supplied by punch solenoid 120 which, when energized, releases a pivoted latch 121, thereby permitting a spring 111 to pull punch link 123 down so as to cause toggle links 122 and 124 to cross center. As the toggles are operated in this manner, the punch guide plate 125, stripper plate 126, and punch die plate 127 are moved forward. Since there is nothing in their paths, all of the punches 130, except two, are stopped by their respective interposer pins 61a and 64a, and the two stationary punches are forced through the card. As the toggles go beyond center, they restore plates 125, 126 and 127 to their original position. This action strips the card from the two punches which have penetrated it by reason of a fixed bar 128 which holds back the punches.

The punching mechanism is restored to the normal, latched position near the very end of the movement of the upstroke of operating handle 75. This operation is performed by a toe 132 (Fig. 2) striking an arm 133 which is pinned to a common shaft 134 with another arm 135. These arms were moved to their lower positions when the operating handle was depressed. As arm 135 (Fig. 3) is carried up, it comes into contact with a toe 136 on the punch link 123 and carries the latter link along. This drags the toggles 122 and 124 back across center, camming toe 129 on punch link 123 past the punch latch 121 and thereby restoring the punching mechanism to the normal position.

Printing mechanism

When the punch latch 121 (Fig. 3) is operated by the punch solenoid 120 acting on arm 119, movement is transferred through an arm 140 and a link 141 to the start and stop print hammer latch 142 to cause unlatching the print hammer operating arm 143. As this occurs, spring 110 urges arm 143 forward against a stop 145. Start and stop print hammer 146 is carried forward with the operating arm 143, thereby stretching return spring 147. The print hammer continues forward under its own momentum until it strikes the typewheels and settles back to rest on operating arm 143.

Hammer 146 and arm 143 are restored to their normal, latched position by the tension of overthrow spring 147 during the upstroke of the handle 75 when tension is removed from spring 110.

A solenoid 150 (Fig. 2), when energized, provides the power for effecting the printing operation in that it trips a latch 149 which, in turn, operates latch 142, allowing both the stop and start print hammer 146 and the elapsed time print hammer 148 to operate. The action of both hammers is the same.

Borrow mechanism

Whenever a condition occurs in which the number of tenths in the elapsed time wheels for the "checking in" operation is greater than at the time of "checking out," it becomes necessary to subtract an additional hour from the elapsed hours typewheel. This is performed by mechanism commonly referred to as "borrow" mechanism working in conjunction with a plurality of movable racks as will be explained presently.

During the reversing of the elapsed tenths-of-hours typewheel, as this wheel passes from the "9" to the "0" position, a pin 154 (Fig. 8) strikes camming surface 155 on borrow arm 156 causing the actuation of borrow bail 157 and the unlatching of borrow rack latch 160. This permits borrow rack 161 to drop two teeth so as to reverse the elapsed hours typewheel one additional space.

Borrow rack 161 is restored to normal by a block 162 on the carriage 92. Block 162 also holds sensing pawls 81 clear of the card until carriage 92 has started the down stroke.

A cam arm 163 is provided to restore borrow rack latch 160 to its normal position by working against pin 164. The arm 163 is flexible and remains so until locked between arms 165 and rack 99, when rack 99 is raised by block 162 on carriage 92. This prevents borrow rack latch 160 from wedging against the back of borrow rack 161. Arm 165 also serves to hold rack contacts 166 open until rack 99 is carried down by carriage 92.

Ribbon feed and reverse

The ribbon is fed by a pawl 167 (Fig. 1) working on a ratchet 168 and operated by an arm 169 which, in turn, is operated by the surface of cam 170 on the operating handle 75. The ribbon is mounted on spools 176 and 177 and is wound and unwound alternately from one to the other in any conventional manner. As this mechanism forms no part of the instant invention, it is believed that further description is unnecessary.

Program device

Figure 10:
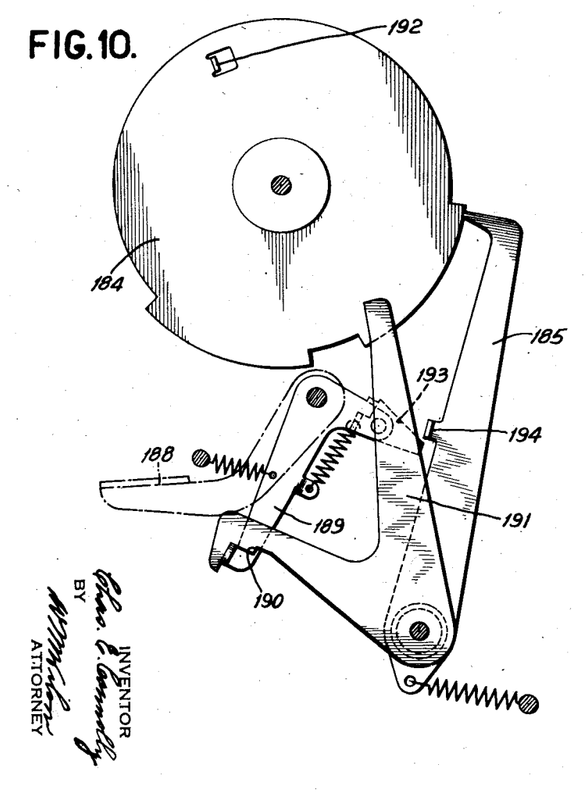
Figs. 10 and 11 are views of the program device in the locked and operated positions, respectively.
Figure 11:
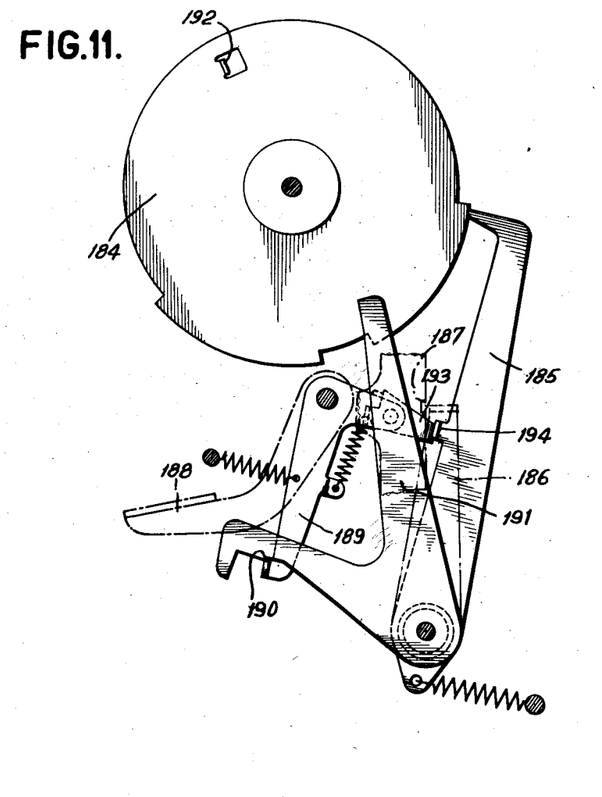

Provision is made for controlling time-out periods by means of a program cam 184 (Figs. 10 and 11). When a cam arm 185 drops to a low level in the periphery of cam 184, it allows latch 186 to engage in a notch 187 on the elapsed tenths feed slide, preventing the slide from functioning until the arm 185 is cammed back to a higher level on cam 184.

The program device may be disabled by depressing an arm 188. This latches arm 189 behind latch point 190 on latch arm 191 until it is kicked off by the toe 192 on cam 184. While in the latched position, a dog 193 is interposed in the path of toe 194 on cam arm 185, preventing the latter from dropping to a lower level on cam 184.

Typewheel detents and minute finder

A pair of typewheel detents 195 and 196 serve to keep the elapsed typewheels in position during the time between disengaging transfer pinion 87 and engaging racks 99 and 100.

Overthrowing of the typewheels on the return stroke of racks 99 and 100 is also prevented by locking detents 195 and 196 between gear 112 and surface 198 on rack 99, or between gear 113 and cam surface 199 on rack 100 as the case may be. The locking action takes place just as the last tooth on the particular rack is leaving its gear. Also, the gears are positioned positively to receive the racks on the down stroke of the carriage.

Detents 196 and 197 are locked by a locking bail 200 at the end of the down stroke of the carriage 92, operating on a toe 201 on the carriage 92. The motion of arm 202 is (Fig. 2) transmitted to lock bail 200 through link 203, operating arm 204, and shaft 205. This locking action prevents racks 99 and 100 from overthrowing at the end of the down stroke.

The movement of arm 202 also operates the minute finder link 206 which aligns the minute units typewheel at the previous minute by reversing the minute finder ratchet 207 until the ratchet locks itself between the leading end 208 and the back 209 of the finder link 206. The reversing movement is taken up by tensioning a spring 210 in minute finder coupling 29. When finder link 206 is withdrawn from ratchet 207, the typewheel is restored to its former position by spring 210.

Electrical control devices

*Double start contacts.*—When the handle 75 is operated and begins its downward movement, it allows arm 135 (Fig. 3) to fall away from toe 217 on arm 218. This permits a sensing pawl 219 to press against the back of the card. Contacts 220 are arranged to be operated in accordance with the position of the pawl 219 and, for the condition just described, the contacts are held closed. If there is a hole already punched in the card, pawl 219 enters the hole and is pulled down across center. This permits contacts 220 to open and thereby prevent energization of the punch solenoid 120. The circuit will be considered later. It will be appreciated that the function of contacts 220 is to prevent a second punching operation from occurring if the perforated card is reinserted in the same way in the card receiver.

*Current failure solenoid.*—Solenoid 223 is energized when button 222 is depressed and normally remains energized at all times except, of course, when there is a power failure. A plunger 224 is moved by the energized solenoid 223 so as to be out of the path of the card, leaving the card guide 225 open. When a power failure occurs, solenoid 223 releases plunger 224 which then assumes a position to prevent any insertion of a time card.

*Master contacts.*—The master contacts 237 (Fig. 2) are closed by the card operating on toe 238 of lever 239. The function of these contacts is to insure against operating the machine without a card or with a card only partly inserted.

General operation and circuits

Figure 12:
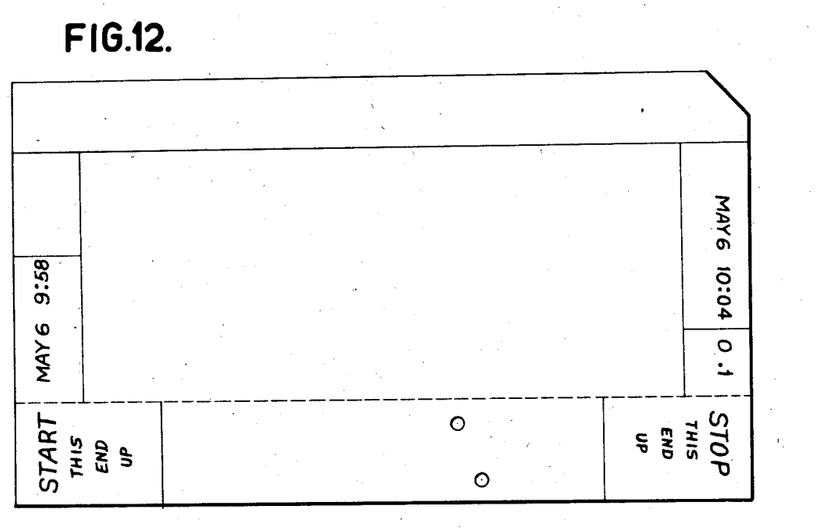
Fig. 12 illustrates a typical form of record card.
Figure 13:
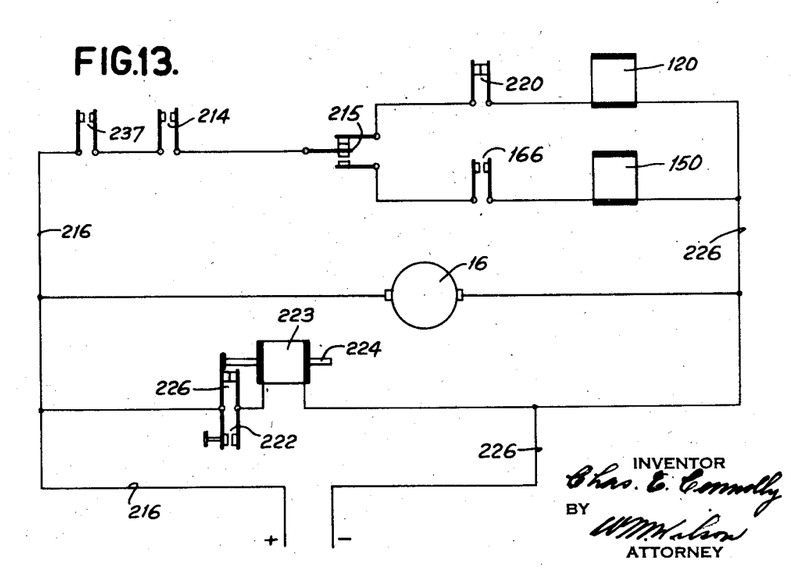
Fig. 13 is a circuit diagram of the machine.

*Starting operation.*—When "checking in," the employee inserts his card in the card receiver 225 with the cut-off corner in the lower right hand corner as indicated on the face of the card (Fig. 12). The handle 75 is then pushed down operating a card gripper 90 which pulls the card down into the machine. Upon reading its extreme lower position, the cut-off corner of the card is sensed by a pair of contacts designated 214 and 215, thus selecting the punching and printing solenoid 120 for energization. The circuit is shown in Fig. 13 and is traceable from positive line 216, master contacts 237 which are now closed, upper and center straps of contacts 215, contacts 220, solenoid 120 to negative line 226. Energizing this solenoid causes the machine to print the date and starting time on the top end of the card and to punch two holes in the left hand edge of the card. These holes are located in accordance with the positions of the two elapsed time typewheels since, as it will be remembered, the punch selector shafts 61 and 64 are driven in synchronism with the elapsed time typewheels.

The handle 75 is then released, allowing the card to return under the urging of spring 77 to a position where it may be retrieved by the operator, and restoring the machine to its normal condition ready for the next operator to check in or out as may be required.

Figure 8:
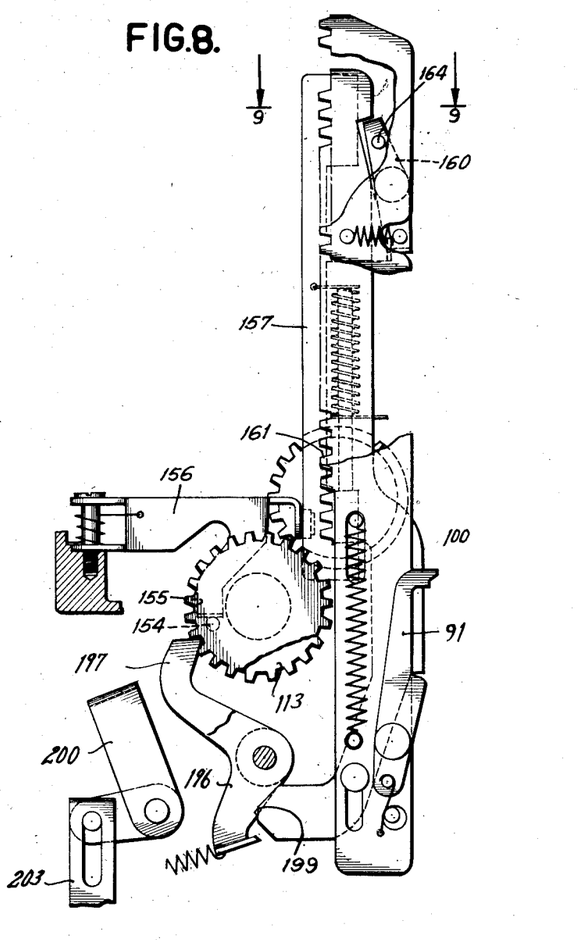
Figure 9:
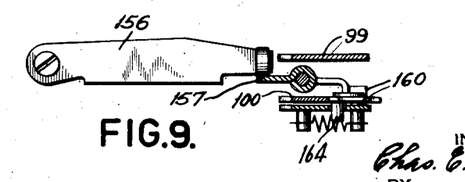

*Stopping operation.*—In "checking out," the procedure is much the same as "checking in," except that the card is inserted upside down. Since this brings the holes, already punched in the card during the "checking in" operation, to the right side of the machine the sensing pawls 81 (Fig. 8)

are allowed to drop into the holes 235 in the carriage 92 during its downward travel, thereby pulling the racks 99 and 100 down with them. As the racks move down, they mesh with gears 112 and 113 connected to the elapsed time wheels 55 and 56 and cause reverse movement of these wheels to an extent equal to the time indicated on the wheels at the "checking in" operation. This causes the wheels to be positioned for printing the time elapsed between the "checking in" and "checking out" operations.

Because the cut-off corner on the card is at the top during the "checking out" operation, it is not sensed by contacts 214 and 215. As a result, contacts 214 and 215 are operated by the full corner of the card to cause energization of print solenoid 150 by a circuit from positive line 216, contacts 237 now closed, contacts 214 also closed, center and lower straps of contacts 215, rack contacts 166 which are closed by the positioned racks, solenoid 150, to negative line 226. The energization of solenoid 150 causes the machine to print elapsed time and stopping time on the opposite end of the card from the end on which the starting time was printed. The upstroke of the carriage again restores the machine to normal.

The synchronous motor 16 is continuously running as indicated by its direct connections across the line. The power failure solenoid is energized after a power failure through button contacts 222 and held energized through parallel contacts 226. The solenoid is shown in its normally energized position with plunger 224 attracted and contacts 226 closed.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. An elapsed time recorder comprising, in combination, a card receiver adapted to receive a record card, a manual operating handle for inserting the card fully into the receiver when the handle is operated, time-controlled card perforating means, means for determining whether the card has been inserted in a predetermined manner to control the operation of the perforating means accordingly to make perforations in the card representative of the starting time, a plurality of elapsed time wheels, and means for sensing the perforations when the perforated card is reinserted in a different predetermined manner for rotating said elapsed time wheels to differential extents dependent upon the location of the perforations, and elapsed time printing means effective upon positioning of said wheels to print elapsed time.

2. An elapsed time recorder comprising, in combination, a card receiver adapted to receive a record card, a manual operating handle for inserting the card fully into the receiver when the handle is operated, time-controlled card punching means, means for determining whether the card has been inserted in the correct predetermined position to control the operation of the punching means accordingly to perforate the card to represent starting time, a plurality of elapsed time wheels, and means for sensing the perforations when the perforated card is reinserted in a different predetermined position, a plurality of racks connected between the sensing means and the elapsed time wheels for rotating said elapsed time wheels to differential extents dependent upon the location of the perforations, and elapsed time printing means effective upon positioning of said wheels to print elapsed time.

3. An elapsed time recorder comprising, in combination, a card receiver adapted to receive a record card, an operating handle, a gripper device for gripping the card for movement into the receiver when the handle is operated, combinational time printing and punching means, electrical means for determining whether the card has been inserted in the correct predetermined position to control the operation of the printing and punching means accordingly to print starting time and perforate the card in a characteristic manner, a plurality of elapsed time wheels, a plurality of sensing fingers for the perforations when the perforated card is reinserted in a different predetermined position for rotating said elapsed time wheels to differential extents dependent upon the location of the perforations, and elapsed time printing means effective upon positioning of said wheels to print elapsed time.

4. An elapsed time recorder comprising, in combination, a card receiver adapted to receive a record card, an operating handle, a gripper device for gripping the card for insertion into the receiver when the handle is operated, combinational time printing and punching means, electrical means for determining whether the card has been inserted in the correct predetermined position for controlling the operation of the printing and punching means accordingly to print starting time and perforate the card in a corresponding manner, a plurality of elapsed time wheels, means for sensing the perforations when the perforated card is reinserted in a different predetermined position for rotating said elapsed time wheels to differential extents dependent upon the location of the perforations, and elapsed time printing means effective upon positioning of said wheels to print elapsed time.

5. An elapsed time recorder comprising, in combination, a card receiver adapted to receive a record card, an operating handle, a gripper device for gripping the card for insertion into the receiver when the handle is operated, combinational time printing and punching means, a pair of electrical contacts normally extending into the path of the card for determining whether the card has been inserted in a normal position to control the operation of the printing and punching means accordingly to print starting time and perforate the card in a corresponding manner, a plurality of elapsed time wheels, sensing elements having mechanical connection with the elapsed time wheels for sensing the perforations when the perforated card is reinserted opposite end to the normal position and for rotating said elapsed time wheels to differential extents dependent upon the location of the perforations, elapsed time printing means effective upon positioning of said wheels to print elapsed time, the time printing means becoming effective to print the stopping time.

CHARLES E. CONNOLLY.